Patented Nov. 24, 1953

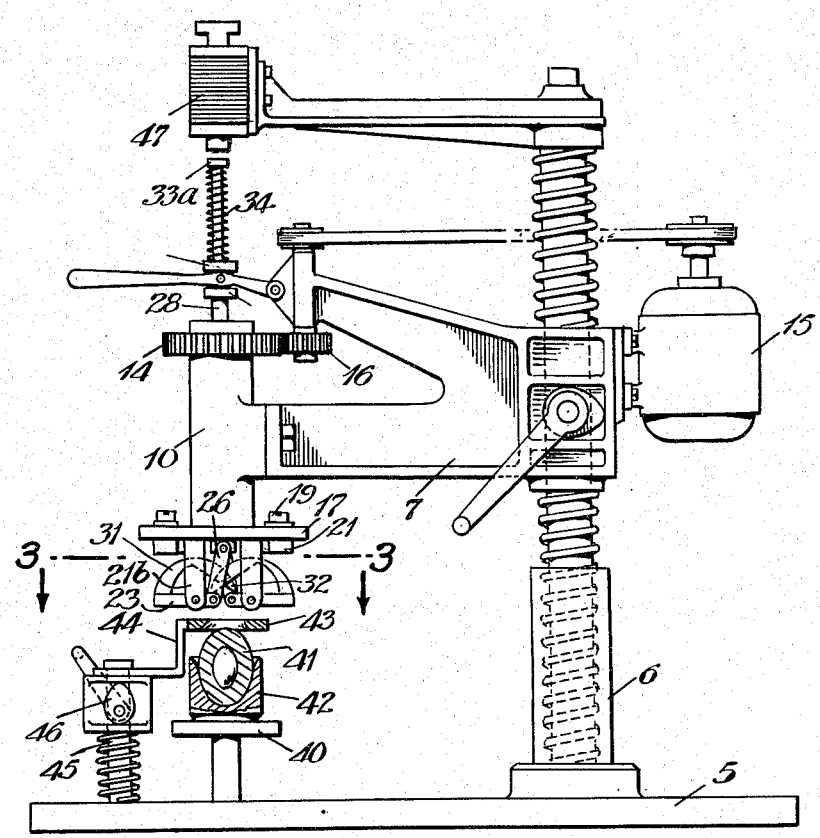

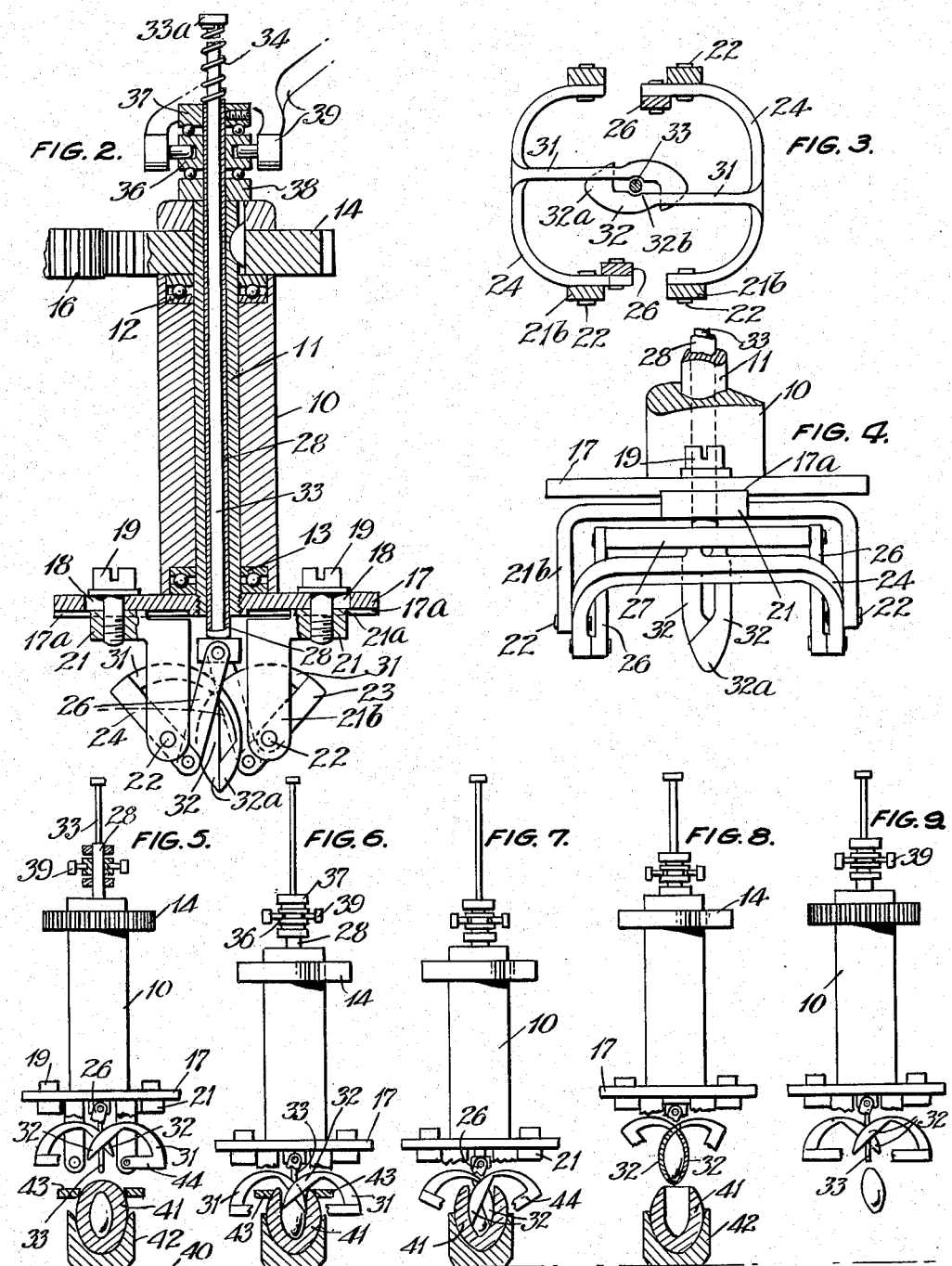

2,660,208

UNITED STATES PATENT OFFICE 2,660,208

PITTING STRUCTURE

Lynn B. Williams, Berkeley, and Joseph C. Calkins, Bolinas, Calif.; said Calkins assignor to said Williams Application March 11, 1950, Serial No. 149,155

7 Claims. (Cl. 146—18)

The present invention relates to a pitting structure for use in connection with fruits, such as olives and cherries, for example, to provide an advantageous method of and apparatus for pit removal, particularly in connection with the production of pitted fruit, such as olives for stuffing. The invention provides for positive severing of the pit from the flesh of the fruit to enable pitting of sizes and types of fruit not pitted successfully by prior apparatus, and also provides for positive removal of the pit through the opening made by the pitting knives upon entering the fruit.

The above and other objects of the invention are attained as illustrated in a preferred embodiment of the invention shown in the accompanying drawings, in which:

Figure 1 is a schematic elevational view of a pitting device embodying the invention.

Figure 2 is a vertical sectional view through the pitting structure of the device.

Figure 3 is a transverse sectional view through the pitting structure, the view being indicated by the line 3—3 in Figure 1.

Figure 4 is an elevational view of the pitting structure taken at right angles to the view of Figure 2.

Figure 5 is an operational view of the pitting structure showing its relation to an olive presented thereto for pitting.

Figure 6 is a view showing the start of the pitting operation.

Figure 7 is a view showing an intermediate position of the parts during the pitting operation.

Figure 8 is a view showing the pit removed, but still held by the pitting means.

Figure 9 shows the pitting knives open and the release of the pit therefrom.

Referring to Figures 1 and 2, the pitting device includes a base 5 having a post 6 on which a frame 7 is slidably mounted. The frame 7 carries a pitting structure including a cylindrical body portion 10 within which a central tube 11 (Figure 2) is journalled by respective bearings 12 and 13. The tube 11 adjacent its upper end has keyed thereto a gear 14 which in turn is driven either intermittently or continuously, as may be desired, from a drive gear 16 and a motor 15 on the frame 7.

At is lower end the tube 11 has threaded thereon a plate 17 which is provided with opposite radial slots 18 in which studs 19 are received. The studs 19 are threaded at their lower ends in to respective pitter support brackets 21 which have extensions 21a adjustably disposed in radial grooves 17a of the plate 17. As seen in Figure 4, each bracket 21 is provided with opposite depending arm portions 21b which are apertured adjacent their lower ends to receive pivot pins 22 supporting respective knife yokes 23 and 24 therein. The knife yokes 24 are connected at their inner ends by respective toggle links 26 with a transverse bar 27 which is suitably secured at the lower end of an actuating tube 28 referred to in greater detail hereinafter.

The knife yokes 23 are of generally arcuate contour and from the central portion of each yoke there extends inwardly an arcuate arm 31 having integrally formed thereon at its inner end an arcuate spoon-shaped knife 32 whose radius of curvature is struck from the axis of the pivot 22 associated therewith. As seen in Figure 3 the lower or end-most portion 32a of each knife is complete in width, while the upper portions of the knives are cut-away respectively at 32b to be disposed in overlapping scissors-like relation. The respective knives 32 are also recessed to clear the central pit ejector rod 33 in the open position of the knives as seen in Figures 3 and 9.

The ejector rod 33 (Figure 2) extends upwardly through the cross bar 27 and the tube 28 and is spring-urged to its upper inactive position by a compression spring 34 interposed between the upper end of tube 28 and a head 33a of the rod. The actuating tube 28 carries a grooved collar 36 which, with respective bearing races 37 and 38, form thrust bearings at either side thereof. The collar 36 is engaged by the forked end of a suitable actuating lever 39 carried by the frame 7 for raising and lowering the tube.

The various parts of the pitting structure described above are all mounted for movement axially with the frame 7 under control of an eccentric cam 8 on the post 6 to engage the spoons or knives 32 with an olive 41 carried in oriented position in a support cup 42 on a table 40. Obviously, if desirable, the support cup 42 can be mounted to move to engage the olive with the pitting structure stationary. The olive 41 is oriented with its stem blossom axis aligned or substantially aligned with the longitudinal axis of the pitting structure as shown in Figure 5 for example. Relative movement between the pitting structure and the support cup 42 causes the knives (which are rotating at this time) to make a circular incision into the end of the fruit which is presented to them. The relative movement between the pitting structure and the support structure or cup carries the knives about halfway into the fruit. The curvature of the spoons 32 is selected to approximate the lengthwise curvature of the pit so that as the knives are operated to penetrate the olive as shown in Figure 6. The pivotal centers 22 of the knives are positioned in substantial alignment with the centers of curvature of the respective sides of the pit when considered in a vertical plane bisecting the olive pit and symmetrically disposed with respect to said axes. At the same time, an olive retaining ring 43 (Figure 5) is moved to engage the upper end of the olive for a purpose later described. The ring 43 is suitably mounted on the base 5 by a support bracket 44 and a post 45, and has its vertical position controlled by an eccentric cam 46. As seen in Figure 6, the knives 32 enter the olive inside of the ring 43, clearance for which is provided by the arcuate shape of the knife arms 31.

At this time the pivotal movement of the knives is started from the position shown in Figure 6 to the position shown in Figure 7 and this movement substantially along the surface of the pit is continued so that the knives make a circular cut about the pit and, when fully closed, completely sever the pit from the flesh of the olive. The pivotal movement of the knives in entering the pit is effected about the pivot axes 22 by downward axial movement of the tube 28, under control of the lever 39. As the tube 28 is moved from its upper position shown in Figures 5 and 6 to an intermediate lower position shown in Figure 7 and to a final fully closed position similar to that shown in Figure 8, the toggle links 26 pivot the knife yokes 23 and the knives 32 until the knives have completely encompassed the pit. In Figure 8, the pitting structure has also been withdrawn so that the pit is removed from the olive but is still held by the knives.

During this withdrawing movement, the retaining ring 43 operates to hold the olive in the cup during withdrawal of the pit. As seen in Figure 9 the cup 42 and the olive 41 have been moved out of aligned position with respect to the pitting structure and the pit ejector rod 33 has been actuated by suitable means such as the solenoid 47 (Figure 1) to move downwardly and free the pit from the knives 32 as they are opened.

While we have shown and described a preferred embodiment of the invention it will be understood that the invention is capable of variation and modification from the form shown so that its scope should be limited only by the scope of the claims appended hereto.

We claim:

1. A pitter comprising a member for supporting a fruit in oriented position with respect to its longitudinal axis, a pitting structure mounted for rotation about an axis aligned with said longitudinal axis and including a pair of oppositely disposed spoon-shaped pitting knives mounted for pivotal movement on said structure about respective parallel axes extending transversely of said axis of rotation and symmetrically arranged with respect thereto, the radius of said knives from their respective axes corresponding substantially to the radius of curvature of a fruit pit along its length, means for rotating said pitting structure, means for effecting relative movement of said knives and said support along said first-named axis to cause said knives to enter a fruit in said support during rotation of said pitting structure, means for effecting pivotal movement of said knives to close over the pit and cut the pit from the fruit, and means for effecting withdrawing movement of said knives from the fruit with the pit held between said knives.

2. A pitter comprising a member for supporting a fruit in oriented position with respect to its longitudinal axis, a pitting structure mounted for rotation about an axis aligned with said longitudinal axis and including a pair of oppositely disposed spoon-shaped pitting knives mounted for pivotal movement on said structure about respective parallel axes extending transversely of said axis of rotation and symmetrically arranged with respect thereto, said knives being partially cut away to overlap each other in scissors-like fashion, the radius of said knives from their respective axes corresponding substantially to the radius of curvature of a fruit pit along its length, means for rotating said pitting structure, means for effecting relative movement of said knives and said support along said first-named axis to cause said knives to enter a fruit in said support during rotation of said structure, means for effecting pivotal movement of said knives to close over the pit and cut the pit from the fruit, and means for effecting withdrawing movement of said knives from the fruit with the pit held between said knives.

3. A pitter comprising a member for supporting a fruit in oriented position with respect to its longitudinal axis, a pitting structure mounted for rotation about an axis aligned with said longitudinal axis and including a pair of oppositely disposed arcuate pitting knives mounted for pivotal movement on said structure about respective parallel axes extending transversely of said axis of rotation and symmetrically arranged with respect thereto, the radius of said knives from their respective axes corresponding substantially to the radius of curvature of a fruit pit along its length, means for rotating said pitting structure, means for effecting relative movement of said knives and said support along said first-named axis to cause said knives to enter a fruit in said support during rotation of said structure, means for effecting pivotal movement of said knives to close over the pit and cut the pit from the fruit, and means for effecting withdrawing movement of said knives from the fruit with the pit held between said knives.

4. A pitter comprising a member for supporting a fruit in oriented position with respect to its longitudinal axis, a pitting structure mounted for rotation about an axis aligned with said longitudinal axis and including a pair of oppositely disposed arcuate pitting knives mounted for pivotal movement on said structure about respective parallel axes extending transversely of said axis of rotation and symmetrically arranged with respect thereto, the radius of said knives from their respective axes corresponding substantially to the radius of curvature of a fruit pit along its length, means for rotating said pitting structure, means for effecting relative movement of said knives and said support along said first-named axis to cause said knives to enter a fruit in said support during rotation of said structure, means for effecting pivotal movement of said knives to close over the pit and cut the pit from the fruit, and means for effecting withdrawing movement of said knives from the fruit with the pit held between said knives, said last-named means including a pair of toggle links and an actuator therefor extending along said axis for effecting pivotal movement of said knives.

5. A pitter comprising a member for supporting a fruit in oriented position with respect to its longitudinal axis, a pitting structure mounted for rotation about an axis aligned with said longitudinal axis and including a pair of oppositely disposed spoon-shaped pitting knives mounted for pivotal movement on said structure about respective parallel axes extending transversely of said axis of rotation and symmetrically arranged with respect thereto, said knives being partially cutaway to overlap each other in scissors-like fashion, the radius of said knives from their respective axes corresponding substantially to the radius of curvature of a fruit pit along its length, means for rotating said pitting structure, means for effecting relative movement of said knives and said support along said first-named axis to cause said knives to enter a fruit in said support during rotation of said structure, means for effecting pivotal movement of said knives to close over the pit and cut the pit from the fruit, and means for effecting withdrawing movement of said knives from the fruit with the pit held between said knives, and a pit ejector mounted in said structure for movement along said axis.

6. A pitter comprising a support, and a pair of arcuate knives mounted for movement on said support about respective parallel axes with the length of each knife extending transversely with respect to its supporting axis in overlapping relation with respect thereto and to the other knife and with the center of curvature of each knife substantially coincident with its supporting axis, said knives being disposed symmetrically with respect to a longitudinal axis at right angles to said parallel axes and disposed equidistant therebetween, said knives having an open position in which the overlapped ends thereof are spaced apart a distance approximating the diameter of a fruit pit, and being movable from said open position to a closed position in which said ends substantially meet at said longitudinal axis, whereby the pit is substantially encompassed by said knives in the closed position thereof.

7. In a pitter, a fruit cup for holding a fruit in oriented position with reference to its stem-blossom axis, a support member mounted for rotation about an axis coinciding with the stem-blossom axis of a fruit in said fruit cup, a yoke pivotally mounted on said member about an axis disposed transversely of said first-named axis, an arcuate knife carried by said yoke and normally disposed transversely of said first-named axis, said knife projecting from said yoke and extending beyond said first-named axis, and said knife having a cutting end extending generally along said first-named axis to face a fruit in said cup, means for effecting relative longitudinal movement between said fruit cup and said support member during rotation of said support member to cause said knife to enter the end of a fruit in said fruit cup, and means brought into play after said knife has cut into said fruit for a distance substantially half way along the pit of the fruit for effecting relative pivoting of said yoke and said knife to continue the cutting action around said pit with said knife closely following the contour of said pit to effect entire severance of the pit from the flesh of the fruit.

LYNN B. WILLIAMS.
JOSEPH C. CALKINS.

References Cited in the file of this patent

UNITED STATES PATENTS

| Number | Name | Date |
| --- | --- | --- |
| 1,500,085 | Leavitt | July 1, 1924 |
| 1,785,003 | Duncan | Dec. 6, 1930 |
| 1,876,492 | Frova | Sept. 6, 1932 |
| 1,936,184 | Boynton | Nov. 21, 1933 |
| 1,982,779 | Ayars | Dec. 4, 1934 |
| 2,192,444 | Jepson | Mar. 5, 1940 |
| 2,197,794 | Ewald | Apr. 23, 1940 |
| 2,433,125 | Kane | Dec. 23, 1947 |

FOREIGN PATENTS

| Number | Country | Date |
| --- | --- | --- |
| 109,534 | Australia | Jan. 25, 1940 |
| 250,784 | Italy | Nov. 11, 1926 |